United States Patent [19]

Ohkawa et al.

[11] Patent Number: 4,778,038
[45] Date of Patent: Oct. 18, 1988

[54] CONTROL APPARATUS FOR AUTOMOBILE CLUTCH

[75] Inventors: Akira Ohkawa; Hiroshi Yoshimura, both of Yokohama; Toshifumi Koshizawa, Kawasaki, all of Japan

[73] Assignee: Isuzu Motors Limited, Tokyo, Japan

[21] Appl. No.: 30,561

[22] Filed: Mar. 27, 1987

[30] Foreign Application Priority Data

Mar. 28, 1986 [JP]   Japan ................... 61-70373

[51] Int. Cl.$^4$ ............................................. B60K 41/28
[52] U.S. Cl. ................. 192/0.044; 192/0.09; 192/103 F
[58] Field of Search ............... 192/0.055, 0.052, 0.092, 192/0.076, 0.09, 0.044, 103 F

[56] References Cited

U.S. PATENT DOCUMENTS

| | | | |
|---|---|---|---|
| 4,509,625 | 4/1985 | Tellert | 192/0.052 |
| 4,576,265 | 3/1986 | Komura et al. | 192/0.055 |
| 4,632,231 | 12/1986 | Hattori et al. | 192/0.076 |
| 4,732,248 | 3/1988 | Yoshimura et al. | 192/0.055 |

FOREIGN PATENT DOCUMENTS 0252032  12/1985  Japan ........................ 192/0.092

*Primary Examiner*—Rodney H. Bonck
*Attorney, Agent, or Firm*—Staas & Halsey

[57] ABSTRACT

A control apparatus for an automotive clutch sets engine rotational speeds set for respective gear positions for disengaging the clutch, and disengages the clutch when the engine rotational speed drops below the set engine rotational speed corresponding to a present gear position at the time a braking force is higher than a preset value upon actuation of a brake. The control apparatus determines a rate of reduction of the engine rotational speed when the brake is actuated, and disengages the clutch when an integrated value of the rate of reduction of the engine rotational speed corresponds to one of preset values set for the respective gear positions.

10 Claims, 4 Drawing Sheets

CONTROL APPARATUS FOR AUTOMOBILE CLUTCH

BACKGROUND OF THE INVENTION

1. Field of the Invention

The present invention relates to a control apparatus for a clutch disposed between an engine and a gear transmission on an automobile, and more particularly to a clutch control apparatus for disengaging a clutch in order to prevent an engine from being forcibly stopped when a brake is operated.

2. Description of the Prior Art

Automatic clutch control apparatus have been used in recent years for controlling the operation of a clutch between an engine and a gear transmission on an automobile based on operating conditions of the automobile such as the rotational speed of the engine and the amount of depression of an accelerator pedal.

While the automobile with such an automatic clutch control apparatus is running, the driver may abruptly brake the automobile in case of emergency. If the wheels are stopped while the clutch remains engaged, an excessive load is imposed on the engine causing the engine to stop its operation. To prevent the engine from being shut off under such a condition, there has been proposed an automatic clutch control method for disengaging the clutch when the automobile is abruptly braked by detecting that the deceleration of the automobile is larger than a certain deceleration limit (see Japanese Laid-Open Patent Publication No. 60-8553).

The applicant has proposed a clutch control system wherein a clutch is disengaged on the basis of a detected signal supplied from an automobile braking force detecting means to an electronic controller (see Japanese Patent Application No. 60-205801.)

In the above proposals, various preset and integrated values based on which clutch disengagement is controlled are common values without any concern over transmission gear positions. Therefore, in lower gear positions, the clutch tends to be disengaged too early to utilize effective engine braking, and in higher gear positions, the clutch tends to be disengaged too late, inviting a forced engine stop.

With a clutch control system for use on large-size automobiles, air is present in a brake pipe system to exert a weak braking force at an initial stage and then an abruptly strong braking force at a later stage when the brake is suddenly applied. This characteristic is disadvantageous in that the timing to detect when the wheels are about to lock is apt to be delayed, resulting in the possibility of a forced engine stop.

SUMMARY OF THE INVENTION

It is an object of the present invention to provide an automobile clutch control apparatus capable of reliably disengaging a clutch in case of emergency when the automobile is abruptly braked or is braked while running on a road with a low coefficient of friction, thereby preventing the engine from being put to a forced stop.

According to the present invention, a control apparatus is provided for controlling a clutch disposed between an engine and a gear transmission on an automobile when a brake is actuated, comprising means for detecting the braking force of the brake, means for detecting the rotational speed of the engine, means for detecting the gear position of the gear transmission, means for storing engine rotational speeds set for respective gear positions for disengaging the clutch, and means for disengaging the clutch when the braking force is higher than a preset value and the rotational speed is lower than a preset value corresponding to a present gear position.

According to the present invention, there is also provided a control apparatus for controlling a clutch disposed between an engine and a gear transmission on an automobile when a brake is actuated, comprising means for detecting the rotational speed of the engine, means for determining a rate of reduction of the rotational speed based on a detected signal from the means for detecting the rotational speed, means for detecting the gear position of the gear transmission, means for storing rates of reduction of the rotational speed set for respective gear positions for starting integration, means for effecting integration when the rate of reduction of the rotational speed has reached a preset value corresponding to a present gear position, and means for disengaging the clutch when an integrated value produced by the means for effecting integration exceeds a prescribed value.

According to the present invention, there is also provided a control apparatus for controlling a clutch disposed between an engine and a gear transmission on an automobile when a brake is actuated, comprising means for detecting the rotational speed of the engine, means for determining a rate of reduction of the rotational speed based on a detected signal from the means for detecting the rotational speed, means for detecting the gear position of the gear transmission, means for storing additive values corresponding to rates of reduction of the rotational speed and set for respective gear positions, means for integrating the additive value corresponding to a present gear position, and means for disengaging the clutch when an integrated value produced by the means for integrating the additive value exceeds a prescribed value.

According to the present invention, there is also provided a control apparatus for controlling a clutch disposed between an engine and a gear transmission on an automobile when a brake is actuated, comprising means for detecting the rotational speed of the engine, means for determining a rate of reduction of the rotational speed based on a detected signal from the means for detecting the rotational speed, means for integrating the rate of reduction of the rotational speed, means for detecting the gear position of the gear transmission, means for storing integrated values set for respective gear positions for disengaging the clutch, and means for disengaging the clutch when an integrated value produced by the means for integrating the rate of reduction of the rotational speed exceeds a preset integrated value corresponding to a present gear position.

With the arrangement of the present invention, when the automobile is abruptly braked or the wheels are locked upon strong braking, the clutch is disengaged on the basis of various data items, such as the engine rotational speed corresponding to the present gear position and the rate of reduction of the engine rotational speed. The engine is prevented from being forced to a stop which would otherwise be caused by an abrupt reduction in the engine rotational speed upon braking, irrespective of whether the gear position is a higher or lower gear position. Therefore, the automobile can be driven with safety.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
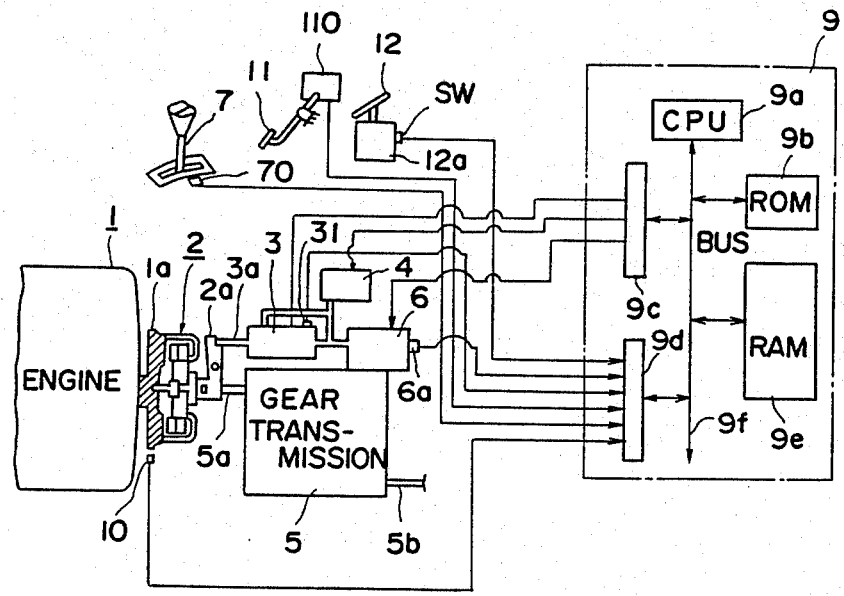
FIG. 1 is a block diagram of a clutch control apparatus according to the present invention for use on an aubomobile having an automatic gear transmission.

As shown in FIG. 1, an engine 1 on an automobile has a flywheel 1a associated with a clutch 2 comprising a known friction clutch which can be engaged and disengaged by a hydraulic clutch actuator 3. The clutch actuator 3 has a piston rod 3a for actuating a clutch release lever 2a for engaging and disengaging the clutch 2. The operative position of the clutch actuator 3 is detected by a clutch stroke sensor 31 which applies a detected signal to an electronic controller 9 (described later). Hydraulic pressure is applied to the clutch actuator 3 by a hydraulic mechanism 4. An automatic gear transmission 5 has an internal gear transmission mechanism therein and includes an input shaft 5a coupled to the driven plate of the clutch 2 and an output shaft 5b. The gear transmission 5 is operated to shift gears by a transmission actuator 6 coupled to the hydraulic mechanism 4. The gear position of the gear transmission 5 is detected by a gear position sensor 6a mounted on the transmission actuator 6 and arranged to apply a detected signal to the electronic controller 9. A selector lever 7 can be operated by the automobile driver into different lever positions for selecting an "N" range (neutral position), a "D" range (automatic gear shifting), a "1" range (first gear position), a "2" range (second gear position), a "3" range (automatic gear shifting between first, second and third gear positions), and an "R" range (reverse gear position). The lever position of the selector lever 7 is detected by a select position sensor 70 which applies a detection signal to the electronic controller 9. An engine rotation sensor 10 is disposed in confronting relation to the flywheel 1a for applying a detection signal to the electronic controller The amount of depression of an accelerator pedal 11 is detected by an accelerator pedal sensor 110 which supplies a detected signal to the electronic controller 9. A brake pedal 12 operates a brake valve 12a having a pressure sensor SW for detecting the pressure of a brake operating fluid, which may be air. A detection signal from the pressure sensor SW is applied to the electronic controller 9.

The electronic controller 9 comprises a microcomputer, for example, and includes a processor (CPU) 9a for effecting arithmetic operations, a read-only memory (ROM) 9b storing a control program for controlling the clutch 2, etc., an output port 9c, an input port 9d, a random-access memory (RAM) 9e for storing the results of arithmetic operations, and a bus (BUS) 9f interconnecting the above components in the electronic controller 9. The output port 9c is connected to the clutch actuator 3 and the transmission actuator 6 and issues drive signals for driving these actuators. The input port 9d is connected to the sensors for receiving detection signals therefrom.

The ROM 9b stores the following maps charts of predetermined relationships for disconnecting the clutch in case of emergency, as well as the control program:

A chart of engine rotational speeds for respective gear positions for disengaging the clutch when intensive braking is applied (the engine rotational speed is higher as the gear position becomes higher; for example, 1st gear position=1,000 RPM, 2nd gear position=900 RPM, 3rd gear position=750 RPM, and 4th, 5th, 6th gear positions=650 RPM);

A chart of rates of reduction of the engine rotational speed for respective gear positions for enabling a brake counter to start integration (the rate of reduction of the engine rotational speed for starting the brake counter is higher as the gear position becomes lower);

A chart of additive values for respective gear positions for being added to the counter dependent on the rate of reduction of the engine rotational speed (the additive value is larger as the rate of reduction of the engine rotational speed becomes larger, and the additive value is smaller for lower gear positions than for higher gear positions); and A chart of integrated values for respective gear positions for disengaging the clutch in an emergency (the integrated value is higher as the gear position is lower).

The charts of predetermined relationships are accessed according to the program stored in the electronic controller 9 based on the detected signal from the gear position sensor 6a, the detected signal from the engine rotation sensor 10, etc.

Figure 4:
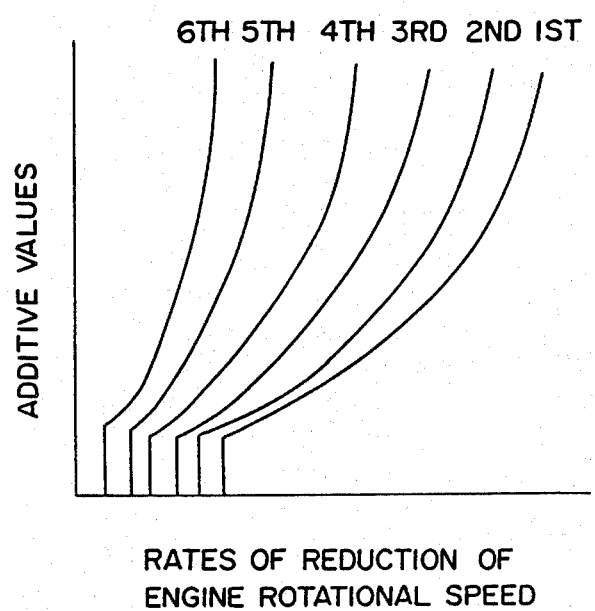
FIG. 4 is a map showing additive values against rates of reduction of the engine rotational speed for each of gear positions.

FIG. 4 shows, by way of example, a chart stored in the ROM 9b, which contains rates of reduction of the engine rotational speed for the respective gear positions for starting integration and additive values corresponding to the rates of reduction of the engine rotational speed.

The brake counter may be provided as a programmable counter in the electronic controller 9, or may be provided separately from the electronic controller 9. The count of the brake counter is incremented each time a signal is supplied from the pressure sensor SW. Comparison of the brake counter count with a prescribed value in the brake counter or a preset value is effected in the CPU 9a.

The CPU 9a is also arranged to make decisions as to numerical values regarding the engine rotational speed and changes thereof based on a detection signal from the engine rotation sensor 10, and as to signals from the other sensors such as the gear position sensor 6a and the clutch stroke sensor 31.

Figure 2:
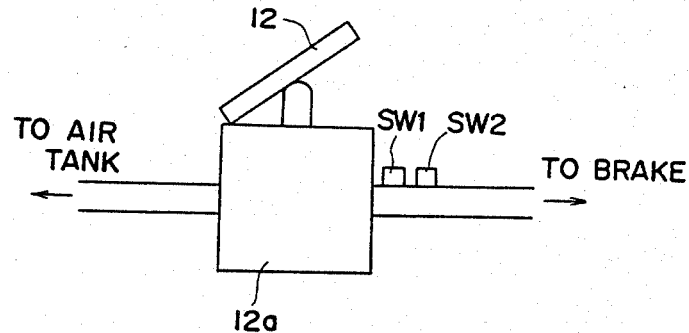
FIG. 2 is a view showing a pressure sensor.

FIG. 2 shows the pressure sensor SW on the brake valve 12a, the pressure sensor SW comprising two switches SW1, SW2. The switch SW1 is turned on when a lower brake air pressure, such as 0.3 kg/cm$^2$, is applied, and the switch SW2 is turned on when a higher brake air pressure, such as 2 kg/cm$^2$, is applied. ON/OFF signals from these switches SW1, SW2 are sent to the electronic controller 9.

Figure 3:
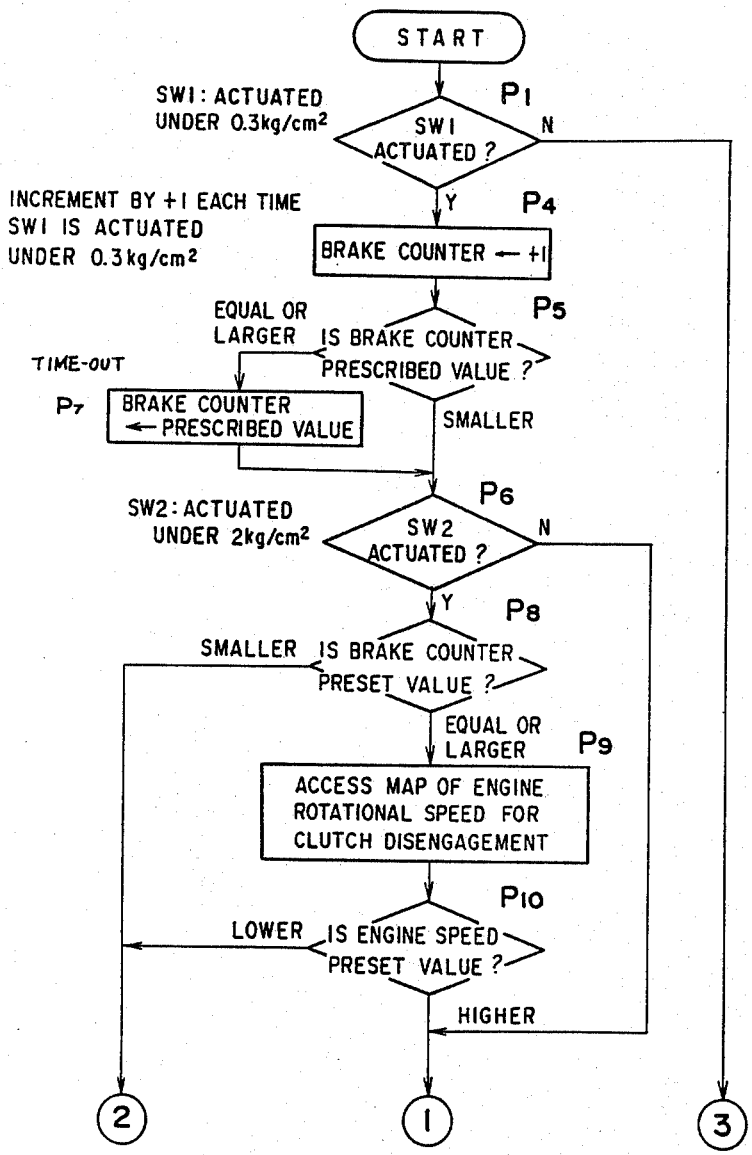
FIGS. 3(A) and 3(B) are a flowchart of a control sequence of the clutch control apparatus.
Figure 3:
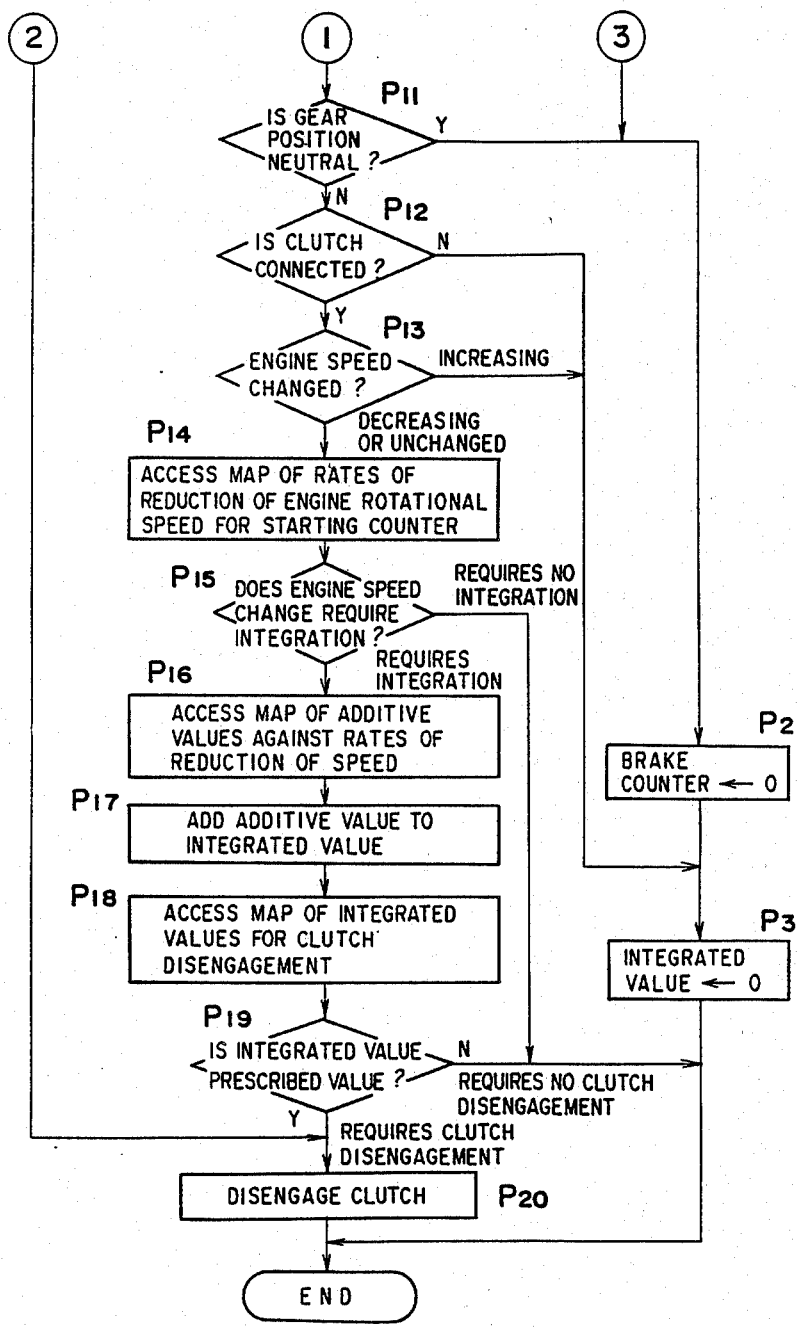

Operation of the clutch control apparatus will be described with reference to FIGS. 3(A) and 3(B).

The electronic controller 9 checks a signal from the switch SW1 (lower pressure switch) of the pressure sensor SW in a step P1 to ascertain whether the brake pedal is depressed or not. If the brake pedal 12 is not depressed with a pressure equal to or higher than 0.3 kg/cm$^2$, the switch SW1 is not actuated and hence control goes to steps P2, P3 in which full initialization is effected by clearing the brake counter and the clutch disengagement integrated value. If the switch SW1 is actuated by depression of the brake pedal 12 in the step P1, then the electronic controller 9 increments the brake counter by +1 in a step P4.

Then, the electronic controller 9 ascertains whether the count of the brake counter is larger than $80 or not in a step P5. If smaller than $80, then control goes to a step P6. If equal to or larger than $80, then the count of the brake counter is set to the prescribed value and a time-out process is executed in a step P7.

Thereafter, the electronic controller 9 checks the switch SW2 in the step P6 which is actuated when the brake pedal 12 is depressed more strongly. If the brake pedal 12 is depressed under a pressure of 2 kg/cm$^2$ or higher, the switch SW2 is actuated, and control proceeds to a step P8 which ascertains whether the count of the brake counter has reached a preset value.

If the count of the brake counter is smaller than the preset value, i.e., if the time after the switch SW1 has been actuated and until the switch SW2 is actuated is shorter than a preset value, then control goes from the step P8 to a step P20 in which the clutch actuator 3 is operated to disengage the clutch 2 for thereby preventing the engine 1 from being forcibly stopped.

If the count of the brake counter is equal to or larger than the preset value in the step P8, then control goes to a step P9 in which the electronic controller 9 accesses the map of engine rotational speeds for the respective gear positions. If the engine rotational speed is lower than the speed at the present gear position, then the clutch 2 is disconnected (from step P10 to step P20). If the engine rotational speed is higher than a preset value in a step P10, then control goes to a step P13 through a step P11 which ascertains whether the gear position is neutral or not and a step P12 which ascertains whether the clutch 2 is completly connected or not. If the gear position is neutral in the step P11, control goes to the step P2 for clearing the brake counter, and if the clutch 2 is disconnected, control goes to the step P3 for clearing the integrated value.

The step P13 ascertains whether the engine rotational speed is increasing, decreasing, or unchanged, based on the detected signal from the engine rotation sensor 10. If the engine rotational speed is decreasing or unchanged, then control proceeds to a step P14 in which the chart of the rates of reduction of the engine rotational speed for starting integration on the counter is accessed for the decreasing or unchanged rate of reduction of the engine rotational speed from the step P13. If the rate of reduction of the engine rotational speed in the present gear position indicates a start of integration on the counter, then control goes from a step P15 to a step P16.

The step P16 accesses the chart of the additive values for the respective gear positions against the rates of reduction of the engine rotational speed to find an additive value for the rate of reduction of the engine rotational speed in the present gear position. The additive value thus found is added to the counter in a step P17.

The electronic controller 9 then accesses the chart of the integrated values for the respective gear positions for emergency clutch disengagement to find an integrated value for clutch disengagement in the present gear position in a step P18. The electronic controller 9 compares, in a step P19, the integrated value found in the step P17 and the prescribed integrated value determined in the step P18. If the integrated value is larger than the prescribed integrated value, then control goes to the step P20 to actuate the clutch actuator 3 to disengage the clutch 2 for thereby preventing the engine 1 from being brought to a forced stop.

According to the embodiment of the present invention, the clutch 2 is disengaged in emergency when:

(1) the time after the switch SW1 of the pressure sensor SW has been actuated and until the switch SW2 is actuated is smaller then the preset value of the brake counter (steps P1, P5, P6, P7);

(2) the engine rotational speed is lower than the engine rotational speed which is found from the chart for clutch disengagement, and the switch SW2 is actuated (steps P7, P9, P10); and (3) the rate of reduction of the engine rotational speed is higher than the preset value according to the chart, and the sum of the additive value obtained from the chart for that rate of reduction of the engine rotational speed and the integrated value of the counter has reached the preset value according to the chart (steps P10 through P19). By thus disconnecting the clutch 2, the engine 1 is prevented from being forcibly stopped.

Although a certain preferred embodiment has been shown and described, it should be understood that many changes and modifications may be made therein without departing from the scope of the appended claims.

What we claim is:

1. A control apparatus for controlling a clutch disposed between an engine and a gear transmission on an automobile when a brake is actuated, comprising:
    means for detecting the braking force of the brake;
    means for detecting the rotational speed of the engine;
    means for detecting the gear position of the gear transmission;
    means for storing engine rotational speeds set for respective gear positions for disengaging the clutch; and
    means for disengaging the clutch when the braking force is higher than a preset value and the rotational speed is lower than a preset value corresponding to a present gear position.

2. A control apparatus according to claim 1, wherein said means for detecting the braking force comprises a fluid pressure sensor for detecting the pressure of a brake operating fluid.

3. A control apparatus according to claim 2, wherein said fluid pressure sensor comprises a pressure switch.

4. A control apparatus for controlling a clutch disposed between an engine and a gear transmission on an automobile when a brake is actuated, comprising:
    means for detecting actuation of the brake;
    means for detecting the rotational speed of the engine;
    means for determining a rate of reduction of the rotational speed based on a detection signal from said means for detecting the rotational speed;
    means for detecting a present gear position of the gear transmission;
    means for storing rates of reduction of the rotational speed set for respective gear positions for starting integration;

means for effecting integration of the rates of reduction when said rate of reduction of the rotational speed has reached a preset value corresponding to the present gear position; and means for disengaging the clutch, when the brake is actuated, when an integrated value produced by said means for effecting integration exceeds a prescribed value.

5. A control apparatus for controlling a clutch disposed between an engine and a gear transmission on an automobile when a brake is actuated, comprising:
means for detecting actuation of the brake;
means for detecting the rotational speed of the engine;
means for determining a rate of reduction of the rotational speed based on a detection signal from said means for detecting the rotational speed;
means for detecting a present gear position of the gear transmission;
means for storing additive value corresponding to rates of reduction of the rotational speed and set for respective gear positions;
means for integrating the additive value corresponding to the present gear position; and
means for disengaging the clutch, when the brake is actuated, when an integrated value produced by said means for integrating said additive value exceeds a prescribed value.

6. A control apparatus for controlling a clutch disposed between an engine and a gear transmission on an automobile when a brake is actuated, comprising:
means for detecting actuation of the brake;
means for detecting the rotational speed of the engine;
means for determining a rate of reduction of the rotational speed based on a detection signal from said means for detecting the rotational speed;
means for integrating the rate of reduction of the rotational speed;
means for detecting a present gear position of the gear transmission;
means for storing integrated values set for respective gear positions for disengaging the clutch; and
means for disengaging the clutch, when the brake is actuated, when an integrated value produced by said means for integrating the rate of reduction of the rotational speed exceeds a preset integrated value corresponding to the present gear position.

7. A control apparatus for controlling a clutch disposed between an engine and a gear transmission on an automobile when a brake is actuated, comprising:
means for detecting actuation of the brake;
means for detectng the rotational speed of the engine;
means for determining a rate of reduction of the rotational speed based on a detection signal from said means for detecting the rotational speed;
means for detecting a present gear position of the gear transmission;
means for storing rates of reduction of the rotational speed set for respective gear positions for starting integration;
means for effecting integration when said rate of reduction of the rotational speed has reached a preset value corresponding to the present gear position;
means for setting integrated values set for respective gear positions of the transmission for disengaging the clutch; and means for disengaging the clutch, when the brake is actuated, when an integrated value produced by said means for effecting integration exceeds a preset integrated value corresponding to the present gear position.

8. A control apparatus for controlling a clutch disposed between an engine and a gear transmission on an automobile when a brake is actuated, comprising:
means for detecting actuation of the brake;
means for detectng the rotational speed of the engine;
means for determining a rate of reduction of the rotational speed based on a detection signal from said means for detecting the rotational speed;
means for detecting a present gear position of the gear transmission;
means for storing rates of reduction of the rotational speed set for respective gear positions for starting integration;
means for storing additive values corresponding to rates of reduction of the rotational speed and set for respective gear positions of the transmission;
means for integrating the additive value corresponding to a present gear position when said rate of reduction of the rotational speed has reached a preset value corresponding to the present gear position; and
means for disengaging the clutch, when the brake is actuated, when an integrated value produced by said means for integrating the additive value exceeds a prescribed value.

9. A control apparatus for controlling a clutch disposed between an engine and a gear transmission on an automobile when a brake is actuated, comprising:
means for detecting actuation of the brake;
means for detectng the rotational speed of the engine;
means for determining a rate of reduction of the rotational speed based on a detection signal from said means for detecting the rotational speed;
means for storing additive values corresponding to rates of reduction of the rotational speed and set for respective gear positions of the transmission;
means for integrating the additive value corresponding to a present gear position;
means for storing integrated values set for respective gear positions of the transmission for disengaging the clutch; and
means for disengaging the clutch, when the brake is actuated, when an integrated value produced by said means for integrating the additive value exceeds a preset integrated value corresponding to the present gear position.

10. A control apparatus for controlling a clutch disposed between an engine and a gear transmission on an automobile when a brake is actuated, comprising:
means for detecting actuation of the brake;
means for detectng the rotational speed of the engine;
means for determining a rate of reduction of the rotational speed based on a detection signal from said means for detecting the rotational speed;
means for detecting a present gear position of the gear transmission;
means for storing rates of reduction of the rotational speed set for respective gear positions for starting integration;
means for storing additive values corresponding to rates of reduction of the rotational speed and set for respective gear positions of the transmission;

means for integrating the additive value corresponding a present gear position when said rate of reduction of the rotational speed has reached a preset value corresponding to the present gear position;

means for setting integrated values set for respective gear positions of the transmission for disengaging the clutch; and means for disengaging the clutch, when the brake is actuated, when an integrated value produced by said means for integrated the additive value exceeds a preset integrated value corresponding to the present gear position.

* * * * *

UNITED STATES PATENT AND TRADEMARK OFFICE
CERTIFICATE OF CORRECTION

PATENT NO. : 4,778,038

DATED : October 18, 1988

INVENTOR(S) : Ohkawa et al

It is certified that error appears in the above-identified patent and that said Letters Patent is hereby corrected as shown below:

Column 3, line 52, "controller" should be --controller 9.--.

Column 4, line 6, delete "maps".

Column 7, line 20, "value" should be --values--.

Signed and Sealed this

Seventh Day of March, 1989

Attest:

DONALD J. QUIGG

*Attesting Officer*    Commissioner of Patents and Trademarks